Jan. 13, 1970   R. R. GOODWIN   3,489,236
EGRESSING DEVICE FOR MILITARY VEHICLES
Filed Aug. 1, 1968   2 Sheets-Sheet 1
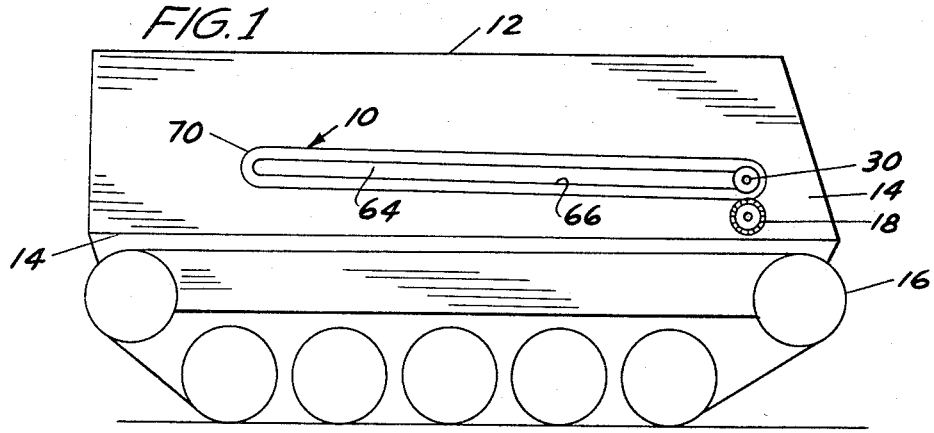
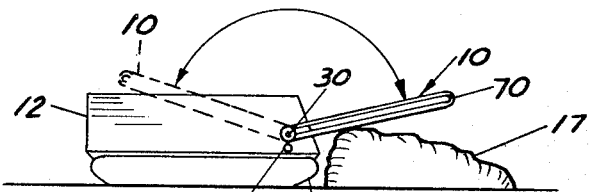
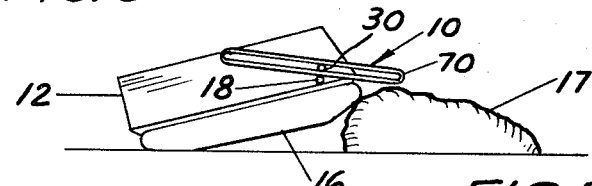
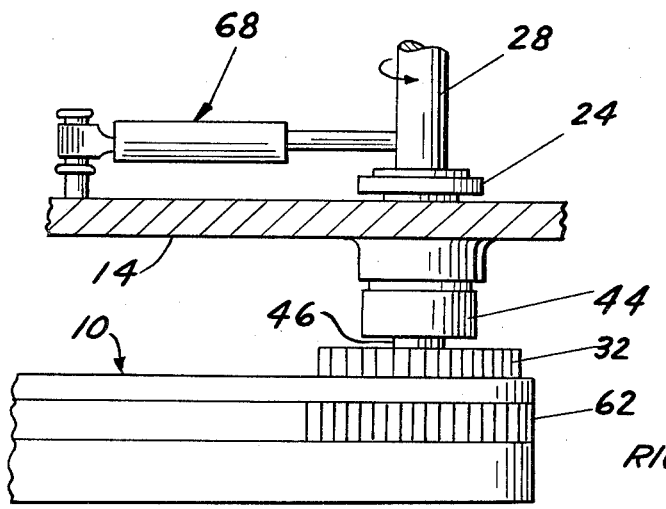
RICHARD R. GOODWIN
INVENTOR.
BY H. M. Saragovitz
E. J. Kelly
H. Berl
and M. V. Wallace
ATTORNEYS Jan. 13, 1970 R. R. GOODWIN 3,489,236
EGRESSING DEVICE FOR MILITARY VEHICLES
Filed Aug. 1, 1968 2 Sheets-Sheet 2
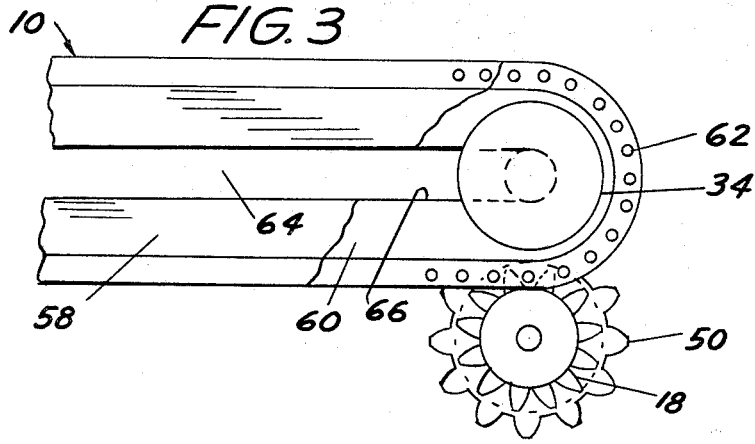
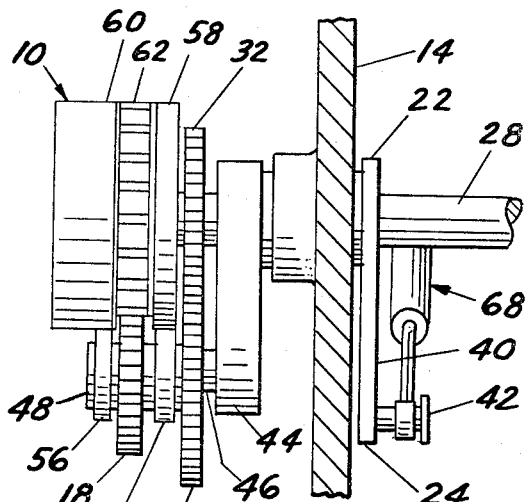
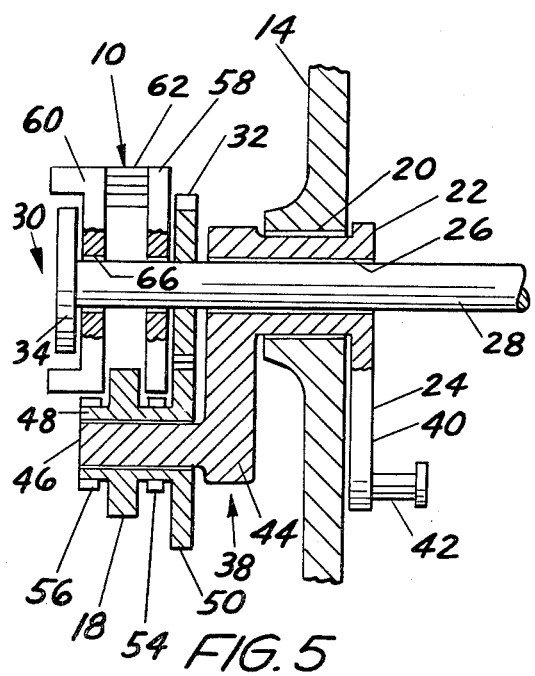
RICHARD R. GOODWIN
INVENTOR.
BY H. M. Saragovitz
E. J. Kelly
H. Berl
and M. V. Wallace
ATTORNEYS

United States Patent Office 3,489,236
Patented Jan. 13, 1970

3,489,236
EGRESSING DEVICE FOR MILITARY VEHICLES
Richard R. Goodwin, Bloomfield Hills, Mich., assignor to the United States of America as represented by the Secretary of the Army
Filed Aug. 1, 1968, Ser. No. 749,492
Int. Cl. B62d *51/06, 55/00*
U.S. Cl. 180—8                                     6 Claims

ABSTRACT OF THE DISCLOSURE

A vehicle combined with a mobility assistance arm which is extendable and rotatable. The arm comprising a pair of slotted plates separated by cogs or pins spaced around the periphery between the plates. The arm being supported by a shaft transverse in the slots and by rollers engaging the edges of the plates. The rollers and sprocket gear to drive the cogs being supported on a pinion rotatable around the centerline of the shaft.

---

The invention described herein may be manufactured, used, and licensed by or for the Government for governmental purposes without payment to me of any royalty thereon.

This invention relates to vehicles such as tanks or other tracked vehicles that must be driven over terrain including normally insurmountable obstacles without assistance from personnel outside of the vehicle. In the past, arms of a fixed length were provided on sides of tanks so that they may be rotated in a vertical plane to assist the crossing of trenches and to enable the tank to execute a hopping motion. Such fixed arms are of limited value because of the wide variety of obstacles encountered by modern tanks and because the speed and range of the modern tank often carries it beyond the help of supporting equipment.

The rotatable arms of this invention are movable in a manner not heretofore provided in that they may be rotated and extended or retracted upon their mountings and the mountings may be rotated. The mechanism disclosed herein provides the tank or vehicle with an arm that may simultaneously translate and rotate upon a support on the side of the vehicle in a plane vertical to the vehicle body.

It is an object of the invention to provide a rotatable arm on tracked vehicles for mobility assistance whereby said arm may be rotated to any position and extended to provide push or lift.

It is another object to provide a rotating arm on tracked vehicles for mobility assistance whereby said arm may be rotated to any position and retracted to provide pull or lift.

The above and other objects of the invention will appear more fully from the following more detailed description and from the drawings wherein:

FIGURE 1 is a side view of a tracked vehicle carrying the assistance arm.

FIGURE 2 is a top view detail of a portion of the arm and its gearing mechanism.

FIGURE 3 is a side view of the arm portion shown in FIGURE 2.

FIGURE 4 is an end view of the arm portion shown in FIGURE 3.

FIGURE 5 is a partial cutaway view of FIGURE 4.

FIGURE 6 is a view of a tank approaching an obstacle; and

FIGURE 7 is a view of a tank surmounting the obstacle.

As shown in FIGURE 1, the arm 10 is carried by vehicle 12 on the side of hull 14 in a storage position shown outboard of track 16. Rotational movement is prevented by sprocket 18 and drive shaft assembly 30 being held immobile as will be shown below. The vehicle shown is a track driven military vehicle and the invention is applicable to many of these including tanks. It is understood that the vehicle will preferably have an identical arm on its opposite side outboard of the opposite track and the description for one side is the same for the opposite side.

FIGURES 2–5 show the details for the arm drive and positioning mechanism. Hull 14 as shown herein is part of the body structure of the vehicle shown but is not an essential part of this invention and is intended to include any suitable base structure whereby the vehicle 12 may be lifted. Hull 14 is provided with a journal 20 which rotatably carries crank bearing 22 of crank 24. Crank bearing 22 is cored to provide a coaxial internal journal 26 which rotatably supports drive shaft 28 having fixed thereon a spur gear 32 and outer thrust bearing 34. Crank assembly 38 comprises crank bearing 22 having fixed thereon, inner throw 40 carrying connecting pin 42 and outer throw 44 carrying pin 46. Pin 46 has rotatably secured thereon a sleeve 48 which carries gears 50 and 18 fixed thereto and rollers 54, 56 rotatable thereon. Arm member 10 comprises a back plate 58 and a front plate 60 secured to each other by cogs 62 around the total periphery. The cogs or pine 62 being selected and spaced to interfit with gear 18 in driving relation as best seen in FIGURE 3. Each plate 58, 60 is provided with a slot 64, 66 respectively which are designed to closely fit the drive shaft 28. The walls of slots 64 and 66 being spaced at the same normal distance from the outer edge of the plates at every point so that arm 10 is held between rollers 54, 56 and drive shaft 28 at any position on the arm 10.

Shaft 28 extends through slots 64 and 66 of arm 10 and thrust bearing 34 and gear 32 prevent lateral movement of arm 10 on shaft 28. Rollers 54, 56 engage the edges of arm 10 to prevent arm rotation about shaft 28 when shaft 28 is located away from the ends of slots 64, 66. Gear 32 meshes with gear 50 which rotates sleeve 48 and spur gear 18 meshing with cogs 62.

Crank assembly 38 is positioned by a suitable device such as a double acting hydraulic piston and cylinder 68 suitably connected between the hull 14 and pin 42 thereby the operator may cause the crank 24 to be held stationary or rotated at will in either direction. Shaft 28 is locked by a suitable brake or rotated in either direction at the will of the operator by means of a suitable clutch and drive train from a prime mover, not shown. The crank actuator, shaft brake, and power train not being part of this invention and being of well known construction need not be further described.

The operation of the device will be described first without the arm engaging an obstacle. Starting with arm 10 in position as shown in FIGURE 1 and with the center line of throw 44 held stationary in the 6 o'clock position, shaft 28 is caused to rotate clockwise turning gears 32, 50 and 18. Sprocket gear 18 drives cogs 26 to the left as best viewed in FIGURE 3. Shaft 28 being at a first end of slots 64, 66 prevents movement of arm 10 to the left but allows arm 10 to rotate clockwise. When rotation of arm 10 is carried out 180° in this case, the sprocket gear 18 and rollers 54, 56 will drive and constrain arm 10 to move it back in a horizontal plane until the shaft 28 reaches the other end of slots 64, 66 where the motion is repeated again at this end. It will be understood that since the crank can be moved at the same time as shaft 28, the rotation of the arm 10 described above can be carried out for an infinite number of starting angles; and by coordinating the movements of shaft 28 and crank 24 the arm end 70 can be placed at any point in the plane of rotation of arm 10 and caused to exert a force in any direction desired in that plane upon that point. The above motion may also be described as enabling the operator to apply a force to the tank transverse through journal 20 in an infinite variety of directions and sizes.

As shown in FIGURES 6 and 7, when the vehicle moves up to an obstacle such as rock 17, the operator causes shaft 28 to rotate clockwise while holding crank assembly 38 stationary. Shaft 28 rotates gear 32 causing gears 50 and 18 to rotate. Gear 18 moves counter-clockwise and drives cogs 62 thereby rotatings the arm 10 forward until the obstacle is engaged by the arm as in FIGURE 6. Further rotation of shaft 28 raises the front of the vehicle until the arm is 90° from the centerline of throw 44 where further elevation is obtained by rotating the crank 38. When the front of the vehicle tracks can clear the rock, a combination of track drive and arm movement enable the vehicle to surmount the rock.

It is also contemplated in this invention that the arm on each side of the vehicle may be independently operated if desired and may further be provided with additional structures on the extremities 70 of the arms such as claws if it is desired to grip the terrain in front of the vehicle to use the arms as a vehicle pulling device or pads of increased area to enhance the use of the arms as a vehicle pushing device. These additional structures would be particularly valuable on amphibious vehicles expected to climb river banks.

Having thus described my invention there will be modifications apparent to those skilled in the art and my invention should not be limited to that specifically shown.

I claim:

1. A mobility assistance device for a self-propelled vehicle provided with a hull, comprising:
   a crank including a cored bearing rotatably secured to said hull on the exterior of said bearing;
   means connected to said crank for rotating said crank;
   a drive shaft extending from the interior of said hull through said cored bearing;
   an arm member movably attached to said drive shaft; and
   means attached to said crank for gripping and driving said arm member by cooperation with said drive shaft whereby said arm member may be rotated about said drive shaft axis and extended or retracted radially from said drive shaft axis to provide mobility assistance by contact with and exerting force upon the adjacent terrain.

2. A mobility assistance device as set forth in claim 1, wherein:
   said crank includes an inner throw and an outer throw, and
   said means for rotating said crank comprises hydraulic means secured between the inner throw and the hull.

3. A mobility assistance device as set forth in claim 1, wherein:
   said arm member includes walls defining a slot centrally disposed.

4. A mobility assistance device as set forth in claim 3, wherein:
   said arm member further comprises a plurality of spaced plates joined by a plurality of spaced pins around the total periphery of the arm.

5. A mobility assistance device as set forth in claim 3, wherein:
   said means for gripping and driving include a first gear fixed to said drive shaft, and a sleeve member carrying second and third gears for transmitting torque from said drive shaft to said arm.

6. A mobility assistance device as set forth in claim 3, wherein:
   said means for gripping and driving includes at least one roller pressingly engaging the outer edge of the arm whereby said drive shaft and said roller slidingly grip said arm.

References Cited

UNITED STATES PATENTS

| | | | |
|---|---|---|---|
| 1,108,221 | 8/1914 | Parrish | 180—8 |
| 2,378,945 | 6/1945 | Otzmann | 180—8 X |
| 3,357,510 | 12/1967 | Jourdan | 180—7 |

FOREIGN PATENTS

| | | |
|---|---|---|
| 1,261,951 | 4/1961 | France. |

RICHARD J. JOHNSON, Primary Examiner

U.S. Cl. X.R.

180—9.32